Figure 1:
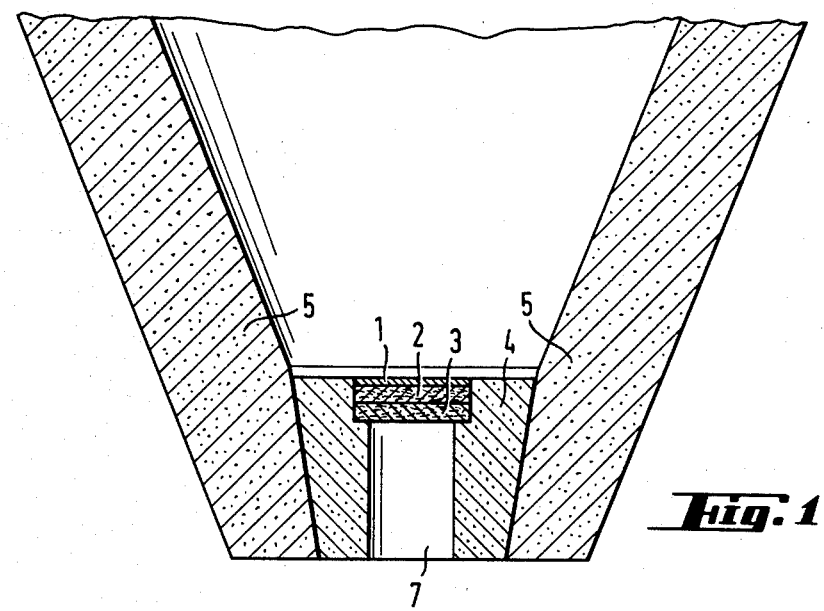

United States Patent [19]

Guntermann et al.

[11] Patent Number: 4,522,322
[45] Date of Patent: Jun. 11, 1985

[54] SELF-OPENING CLOSURE FOR A CASTING CRUCIBLE USED IN ALUMINOTHERMIC REACTIONS

[75] Inventors: Hans Guntermann; Gerhard Skreba, both of Essen, Fed. Rep. of Germany

[73] Assignee: Elektro-Thermit GmbH, Essen, Fed. Rep. of Germany

[21] Appl. No.: 471,689

[22] Filed: Mar. 3, 1983

[30] Foreign Application Priority Data

Mar. 31, 1982 [DE] Fed. Rep. of Germany ....... 3211831

[51] Int. Cl.³ .............................................. B22D 41/08
[52] U.S. Cl. ..................................... 222/597; 266/236; 222/54
[58] Field of Search ................. 222/594, 597, 601, 54; 266/236

[56] References Cited

U.S. PATENT DOCUMENTS 3,831,915  8/1974  Guntermann ....................... 222/597

FOREIGN PATENT DOCUMENTS 2428770   5/1977  Fed. Rep. of Germany .
2222167  10/1974  France .................................. 222/597
197802    2/1978  Japan .................................... 222/597
1581058  12/1980  United Kingdom ................ 222/597
WO80/00546 4/1980 World Intel. Prop. Org. .... 222/597

OTHER PUBLICATIONS

Allgemeinen Thermit Gesellschaft MBH, 1902, pp. 271–285.

Primary Examiner—H. Grant Skaggs
Attorney, Agent, or Firm—Toren, McGeady, Stanger

[57] ABSTRACT

A self-opening closure for casting crucibles used in aluminothermic reactions and made of a high mechanical-strength, high boiling point inorganic material producing no gases when heated, the closure being composed of one or more sealing disk(s) made of a fibrous aluminum silicate, the ratio of the total thickness of the sealing disk(s) to its (their) diameter being 1:5 to 1:1, the melting point of the aluminum silicate being equal to or exceeding 1650° C., and a metal plate between 0.1 and 3 mm thick mounted on the sealing disk(s).

4 Claims, 2 Drawing Figures

U.S. Patent    Jun. 11, 1985    4,522,322

SELF-OPENING CLOSURE FOR A CASTING CRUCIBLE USED IN ALUMINOTHERMIC REACTIONS

This invention relates to a self-opening closure means for casting crucibles used in aluminothermic reactions. The closure is composed of an inorganic material of high melting point which withstands mechanical stresses and will not emit gases when heated.

Aluminothermic reactions typically are carried out in a conically shaped crucible, the discharge orifice of which is exchangeably mounted in the lower, tapered region thereof. The discharge orifice must be closed during the aluminothermic reaction.

The metal melt created by the aluminothermic reaction may drain through the discharge orifice only after the fusion-fluid slag, essentially consisting of aluminum oxide, has separated from the metal melt on which it then floats. If there is premature opening of the discharge orifice, there is danger of a defective casting due to the incomplete reaction of the aluminothermic mixture or due to the as yet incomplete separation of the aluminum oxide slag formed from the metal melt.

The opening of the discharge orifice can be either mechanical or automatic.

When tapping after mechanical opening, the time of the complete separation of the slag from the metal melt is determined by the welder who drives upwardly a nail-like closure pin suspended and sealed in the discharge orifice. This state of the art is disclosed for instance in German Pat. No. 2,230,430. For this kind of tapping of the fusion-fluid metal, the properly selected time for opening the discharge orifice depends upon the experience and skill of the welder. For the reasons given above, tapping cannot be premature; nor may it take place belatedly as otherwise the temperature of the metal melt already will have dropped.

To increase the reliability of welding, closure means for the discharge orifice are known, which will be made to fuse totally within a predetermined time by the aluminothermically produced metal melt. A 1902 pamphlet of the ALLGEMEINE THERMIT-GESELLSCHAFT MBH OF Essen, Germany, described a self-opening closure means for a casting crucible. The crucible opening was sealed therein by an asbestos disk about 0.5 mm thick and 50 mm in diameter supporting a round iron plate 3 mm thick and 30 mm in diameter. Because the asbestos disk was placed underneath the iron plate, reliable closure was assured. The fusion-fluid thermit steel produced fused the metal plate and the asbestos disk, the time of fusion being proportional to the thickness of the asbestos disk and the iron plate above it.

Little has changed since in the principle of a self-opening closure means. The object of German Pat. No. 2,428,770, is the use of a solid tablet with good mechanical strength and which will not emit gases when heated, the specific heat conductivity of which is less than 0.555 cal/msK and the melting point of which is between 1573° and 1873° K., acting as a self-opening closure means for the discharge aperture of a crucible used in aluminothermic fusion welding. Preferably, a tablet made of asbestos board with a content of 98% to 99% asbestos in the form of chrysotile fibers from Canada and with a density of 1.04, a tensile strength of 0.7 kp/mm$^2$, a melting point of 1723° K. and a burn-off loss of about 15% is the closure means claimed in the patent. In this patent also the closure means for the orifice of the casting crucible is the asbestos disk known since the turn of the century. The stated upper limit for the heat conductivity of 0.555 cal/msK provides no additional criterion of selection because any organic barrier material evinces a heat conductivity less than this order of magnitude. The melting point of 1573° K. and 1873° K. (=1300° and 1600° C.) corresponds to the melting range of the asbestos used as the sealing material since the beginning of aluminothermy.

A self-opening crucible closure means as described in German Pat. No. 2,428,770, is unsatisfactory for a number of reasons.

One reason is the use of asbestos as the insulating material. The health risks both in the manufacture of the sealing disk and when using it, in particular at the high temperatures of aluminothermic reactions, are well known.

A further drawback of the claimed sealing disk is its relatively low range of melting points. As a result there is risk that the metal at 2,500° C. will melt through the closure means. Consequently, relatively thick asbestos disks must be used as the sealing material. Moreover, as regards modern welding processes—in particular as concerns joint-welding rails—the trend is toward aluminothermic reactions at still higher temperatures.

Yet another drawback is that the self-opening closure means of German Pat. No. 2,428,770, employs an asbestos disk which is in direct contact with the reacting aluminothermic mixture. When the aluminothermic mixture reacts, strong currents, for instance convection currents, are formed which cause the reaction mixture to violently rise and also to bubble during reaction. The sealing asbestos disk therefore is stressed not only thermally, but also mechanically by the strong currents, and portions of the sealing disk are mechanically detached in an uncontrollable manner and washed away, so that the time span until the closure means will open is directly shortened thereby.

It is the object of the present invention to provide a self-opening closure means wherein the opening time is predetermined in a simple manner and can be maintained in a reproducible manner, with sealing materials being used which preclude impairment of the health of the welding personnel. The cited drawbacks of the self-opening closure means of the state of the art are avoided in the present invention without, however, thereby increasing the costs of the welding process.

This problem is solved by the present invention by using a self-opening closure means composed of one or more sealing disk(s) made of a fibrous aluminum silicate, the ratio of the total thickness of the sealing disk(s) to its (their) diameter being 1:5 to 1:1, the melting point of the aluminum silicate exceeding 1650° C., and a metal plate 0.1 to 3 mm thick being mounted on the sealing disk(s).

An essential feature of the invention is the sealing material. This is a fibrous aluminum silicate which is made solid, using a ceramic binder, into a material like paper or a web. Several plies of these tangled layers of aluminum silicate fibers are combined, similar to the manufacture of multiple-ply paper, making it possible to produce cardboard-like products of arbitrary and predetermined thickness. This material can be commercially obtained, and in grades differing by their melting points. In the present invention, a material is used the melting point of which equals or exceeds 1650° C. A material with a melting point of 1700+/−20° C. is especially preferred. Such a material can be commercially obtained, for instance under the brand NEFALIT 16 (Manufacturer: B. V. Nefabas).

The thickness of the sealing disk is in a given ratio to the diameter thereof. The quotient of thickness to diameter is 1:5 to 1:1, so that for a disk diameter of 20 mm, the thickness will be at least 4 mm. The time of opening the closure means can be controlled by the selected thickness of the sealing disk. Again, the thickness of the sealing disk can be adapted to the heat of reaction of the particular aluminothermic mixture employed. It was found especially advantageous to place several correspondingly thinner disks on top of each other in lieu of one thick one, the compound thickness corresponding to the overall one. Surprisingly, it was discovered that a plurality of such disks increases the reproducibility of crucible tapping time as compared to using a single disk.

A metal plate is placed on this or a plurality of sealing disks, but this metal plate however exceeds the function of that of the state of the art, which is to be supporting only, and it furthermore prevents the bubbling reaction mixture from mechanically abrading the uppermost sealing disk. The metal plate assumes a dual function; on one hand it protects the top side of the upper sealing disk against mechanical stresses, and on the other hand it distributes the heat applied to the sealing disk uniformly over its entire surface because of its high heat conductivity. This is significant because local overheating can take place at the beginning of the reaction which spreads from a single point through the entire reaction mixture. The metal plate obviously will melt during the aluminothermic reaction of the metal melt. However, until it fuses, there is sufficient time to protect the sealing disk underneath it in the manner described above.

Typically, the metal plate is composed of iron or steel. However, it also can be made of a less dense metal, for instance aluminum, a suitable mechanical fastening assuring however that the metal plate will not rise to float. In many cases it was found advantageous to make the metal plate from an alloy of iron-manganese or iron-chromium, for instance, as it is possible in this way to very easily alloy the aluminothermically produced steel with property-controlling metal additives.

In a preferred embodiment, the self-opening closure is mounted in the exchangeable discharge orifice installed in a casting crucible. The self-opening closure means composed of one or more sealing disks with a superposed metal plate can be placed in a corresponding clearance in the discharge orifice. It is possible in this embodiment to sheathe the closure means composed of several individual parts with a foil of metal or plastic for better packing and handling.

In another preferred embodiment, the self-opening closure means is mounted in the lower region of a sleeve which can be plugged into the discharge orifice. This sleeve can be filled in known manner with an aluminothermic reaction mixture. It is immaterial whether the sleeve end projecting into the casting crucible is open, or, if, as in German Pat. No. 2,428,770, it is closed.

The self-opening closure means of the present invention will be further illustrated by reference to FIGS. 1 and 2 of the accompanying drawings. These two Figures show a vertical section passing centrally through the lower part of two embodiments of the casting crucible.

In FIG. 1 the lower part of the casting crucible is denoted by 5. A conical discharge orifice 4 is installed in this casting crucible, including a central discharge conduit 7. An annular clearance is fashioned in the upper region of the discharge orifice 4. The sealing disks 2 and 3 rest on the annular shoulder so formed. A metal plate 1 is placed on the upper sealing disk 2.

Figure 2:
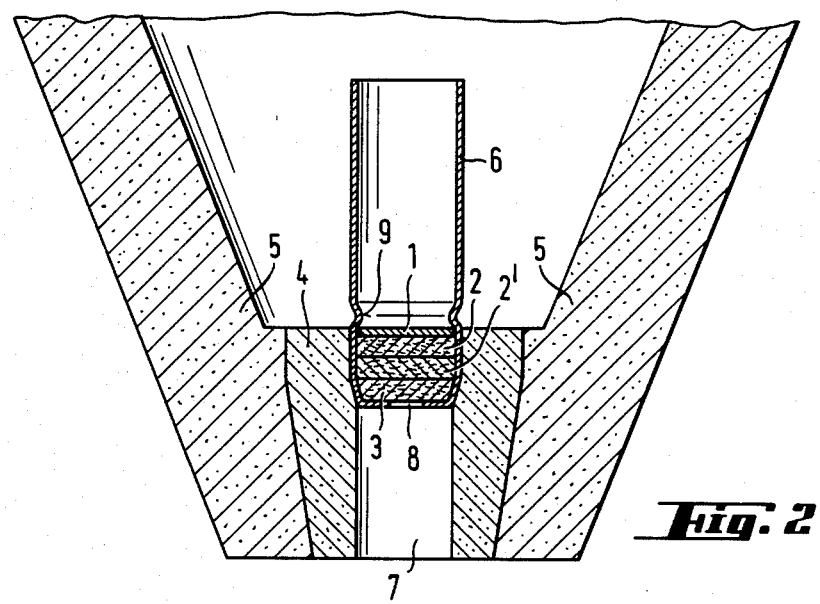

In FIG. 2 the casting crucible is again denoted by 5 and the discharge orifice by 4. A sleeve 6 is plugged into the discharge orifice 4 and includes a central opening 8. The sealing disks 2, 2' and 3 rest on the annular bottom of the sleeve 6. A metal plate 1 is placed on top of the sealing disks. To prevent the sealing disks from falling out, the sleeve is provided with an annular pleat 9 directly above the metal plate 1. The free space of the sleeve above the metal plate can be filled with the aluminothermic mixture. In that case, the sleeve preferably is closed by a cap or it can be squeezed together. The space formed, after insertion of the sleeve 6, by its outside wall, the inside wall of the crucible 5 and the bottom of the casting crucible or the upper boundary surface of the discharge orifice 4 can be filled with sand, for instance slag sand, to protect the discharge orifice 4.

It will be obvious to those skilled in the art that many modifications may be made within the scope of the present invention without departing from the spirit thereof, and the invention includes all such modifications.

What we claim is:

1. In a self-opening closure means for casting crucibles used in aluminothermic reactions, made of an inorganic material resistant to mechanical stresses, generating no gases when heated, and of high melting point, the improvement which comprises that said closure means is composed of a sealing disk (2) made of a fibrous aluminum silicate, the ratio of the thickness of the sealing disk to its diameter being 1:5 to 1:1, the melting point of the aluminum silicate being equal to or greater than about 1650° C., and a metal plate (1) with a thickness of about 0.1 to 3 mm mounted on the sealing disk (2).

2. In a self-opening closure means for casting crucibles used in aluminothermic reactions, made of an inorganic materil resistant to mechanical stresses, generating no gases when heated, and of high melting point, the improvement which comprises that said closure means is composed of a plurality of sealing disks (2) made of a fibrous aluminum silicate, the ratio of the total combined thickness of the sealing disks to their diameter being 1:5 to 1:1, the melting point of the aluminum silicate being equal to or greater than about 1650° C., and a metal plate (1) with a thickness of about 0.1 to 3 mm mounted on the uppermost sealing disk (2).

3. A closure means according to claims 1 or 2 mounted in a discharge conduit (7) of a discharge orifice (4) exchangeably installed in a casting crucible (5).

4. A closure means according to claim 1 or 2 mounted in the lower part of a sleeve (6) designed to be plugged into a discharge orifice (4) of a casting crucible (5).

* * * * *